(12) United States Patent
Nasser (10) Patent No.: US 10,213,035 B1
(45) Date of Patent: Feb. 26, 2019

(54) DIRTY SILVERWARE RETRIEVING DEVICE FOR EATING ESTABLISHMENTS

(71) Applicant: Lina Maria Nasser, Miami, FL (US)

(72) Inventor: Lina Maria Nasser, Miami, FL (US)

( * ) Notice: Subject to any disclaimer, the term of this patent is extended or adjusted under 35 U.S.C. 154(b) by 0 days.

(21) Appl. No.: 15/657,854

(22) Filed: Jul. 24, 2017

Related U.S. Application Data (60) Provisional application No. 62/435,133, filed on Dec. 16, 2016.

(51) Int. Cl.
*A45F 5/02* (2006.01)
*A47G 21/14* (2006.01)

(52) U.S. Cl.
CPC .............. *A47G 21/14* (2013.01); *A45F 5/021* (2013.01); *A45F 5/022* (2013.01)

(58) Field of Classification Search
CPC .. A45F 5/021–5/022; A45F 2200/0575; A45F 2200/05; Y10S 224/904; A47G 21/14
USPC ......... 224/660, 662–663, 665–684, 230, 904
See application file for complete search history.

(56) References Cited

U.S. PATENT DOCUMENTS

| | | | | |
|---|---|---|---|---|
| 1,061,886 A | * | 5/1913 | Tooth | A45F 5/022 2/250 |
| 3,997,092 A | * | 12/1976 | Pogwizd | A45F 3/02 224/610 |
| 5,501,382 A | * | 3/1996 | Webb | A45F 5/02 206/372 |
| 2002/0185509 A1 | * | 12/2002 | Wichman | A45F 5/00 224/677 |
| 2004/0040991 A1 | * | 3/2004 | McCoy | A45F 5/00 224/251 |
| 2013/0206800 A1 | * | 8/2013 | Simonsen | A45F 5/00 224/148.3 |

* cited by examiner

*Primary Examiner* — Scott T McNurlen
(74) *Attorney, Agent, or Firm* — Albert Bordas, P.A.

(57) ABSTRACT

A dirty silverware retrieving device for eating establishments. The retrieving device has a front wall, first and second sidewalls, a rear wall, and a bottom wall. The front wall has a top edge. In a preferred embodiment, the front wall is convexly shaped and the top edge is curved upwardly. A tension arm is substantially parallel to the rear wall.

11 Claims, 7 Drawing Sheets

DIRTY SILVERWARE RETRIEVING DEVICE FOR EATING ESTABLISHMENTS

BACKGROUND OF THE INVENTION

1. Field of the Invention

The present invention relates to silverware collecting devices, and more particularly, to retrieving devices for collecting dirty silverware when clearing tables and taking dirty dishes to a dishwasher.

2. Other Related Applications

The present application claims the priority of the U.S. Provisional Application No. 62/435,133, filed on Dec. 16 2016, which is hereby incorporated by reference.

3. Description of the Related Art

Applicant is not aware of any dirty silverware retrieving devices for eating establishments having the novel features of the present invention.

SUMMARY OF THE INVENTION

The present invention is a dirty silverware retrieving device for eating establishments, which comprises a container assembly comprising a front wall, first and second sidewalls, a rear wall having a bend and a bottom edge, and a bottom wall, wherein the container assembly collects dirty silverware, and a tension arm that extends from the bend a predetermined distance towards the bottom edge, wherein the tension arm is substantially parallel to the rear wall.

The front wall comprises a top edge, first and second side ends and a bottom edge. The first and second sidewalls comprise first and second lateral top edges and first and second bottom ends respectively. The rear wall further comprises first and second side ends. The bend is upwardly rounded and is defined as an upper end of the rear wall. The bottom wall is slightly smaller than a cavity entrance defined by the top edge, the first and second lateral top edge and the bend. The rear wall is substantially parallel to the front wall. In a preferred embodiment, the front wall is convexly shaped and the top edge is curved upwardly. The first and second lateral top edges have a downward curvature and the rear wall is concavely shaped.

The tension arm comprises an exterior face, an interior face, first and second side edges and a distal end edges. The container assembly is secured within a pocket of apron, whereby the container assembly is positioned within the pocket and the tension arm extends over an exterior wall of the respective pocket. The tension arm has a belt holder defining a channel at the interior face. The belt holder extends from the first side edge to the second side edge. The belt holder secures the tension arm to a belt, while the container assembly is upside to receive utensils.

In a first alternate embodiment, the top edge, the lateral top edges, and the bend are substantially horizontal and on a same plane.

In a second alternate embodiment, the sidewalls, and the bottom wall are expandable.

In a third alternate embodiment, the front wall, the first and second sidewalls, and the rear wall define an oval shape.

It is one of the main objects of the present invention to provide a dirty silverware retrieving device for eating establishments.

It is another object of this invention to provide a dirty silverware retrieving device to facilitate the collecting of dirty silverware when clearing tables and taking dirty dishes to a dishwasher.

It is another object of this invention to provide a dirty silverware retrieving device that keeps a busser's hands free.

It is another object of this invention to provide a dirty silverware retrieving device that saves a busser time.

It is another object of this invention to provide a dirty silverware retrieving device that reduces accidents from falling silverware and eating utensils when a busser is retrieving or moving them to a dishwasher and/or cleaning station.

It is another object of this invention to provide a dirty silverware retrieving device that improves a quality of service provided at eating establishments by allowing a busser to stack plates in an easy and safe manner without dirty silverware positioned in between the plates and/or on a top plate.

It is another object of this invention to provide a dirty silverware retrieving device that in a first orientation is worn in an apron pocket.

It is another object of this invention to provide a dirty silverware retrieving device that in a second orientation is secured by its tension arm.

It is another object of this invention to provide a dirty silverware retrieving device for eating establishments that is easy to wear and remove to allow for easy disposal of dirty silverware and eating utensils at a dishwasher and/or cleaning station.

It is another object of this invention to provide a dirty silverware retrieving device for improving quality service and customer satisfaction.

It is another object of this invention to provide a dirty silverware retrieving device that is volumetrically efficient for carrying, transporting, and storage.

It is another object of this invention to provide a dirty silverware retrieving device that can be readily worn and removed without the need of any special tools.

It is another object of this invention to provide a dirty silverware retrieving device, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Referring now to the drawings, the present invention is a dirty silverware retrieving device for eating establishments and is generally referred to with numeral 10. It can be observed that it basically includes container assembly 20 and tension arm 80.

Present invention 10 is used by bussers, commis waiters, and waiter's assistants that work in the restaurant and catering industries clearing tables, taking dirty dishes to the dishwasher, setting tables, and otherwise assisting the waiting staff.

As seen in FIGS. 1, 2, 3, 4, and 5 container assembly 20 comprises front wall 30, sidewalls 40 and 50, rear wall 60 and bottom wall 70.

Front wall 30 has top edge 32. In a preferred embodiment, front wall 30 is convexly shaped and top edge 32 is curved upwardly. Front wall 30 further comprises side ends 34 and 36, and bottom end 38.

Sidewall 40 is connected to front wall 30 by side end 36, and to rear wall 60 by side end 64. Sidewall 40 has lateral top edge 42 and bottom end 44. Lateral top edge 42 has a downward curvature. Similarly, sidewall 50 is connected to front wall 30 by side end 34, and to rear wall 60 by side end 66. Sidewall 50 has lateral top edge 52 and bottom end 54. Lateral top edge 52 has a downward curvature.

Rear wall 60 is substantially parallel to front wall 30. Accordingly, rear wall 60 is concavely shaped. Rear wall 60 comprises side ends 64 and 66, and bottom edge 68. Bend 62 is upwardly rounded and is defined as an upper end of rear wall 60. It is noted that top edge 32 is positioned higher than bend 62.

Tension arm 80 extends from bend 62 a predetermined distance towards bottom edge 68 without reaching bottom edge 68. In a preferred embodiment, tension arm 80 is substantially parallel to rear wall 60. Tension arm 80 comprises exterior face 82 and interior face 83 defined by side edges 84 and 86, and distal end 88. Belt holder 90 comprises channel 92 and is defined at interior face 83. Belt holder 90 is at a predetermined distance from distal edge 88 without reaching bend 62, and extends from side edge 84 to side edge 86.

Bottom wall 70 is defined by bottom ends 38, 44, 54, and 68. Bottom wall 70 is slightly smaller than a cavity entrance defined by top edge 32, lateral top edges 42 and 52, and bend 62.

Figure 1:
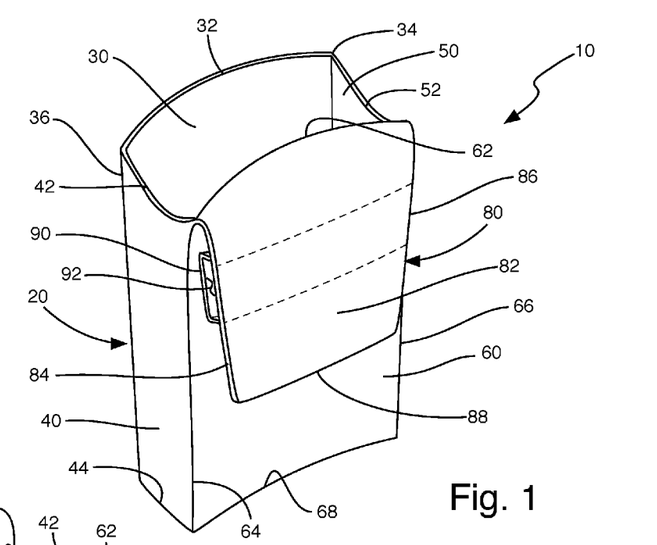
FIG. 1 is a rear isometric view of the present invention.
Figure 2:
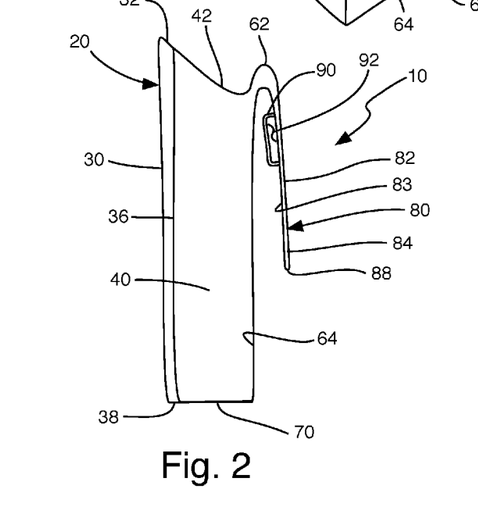
FIG. 2 is a side elevational view of the present invention.
Figure 3:
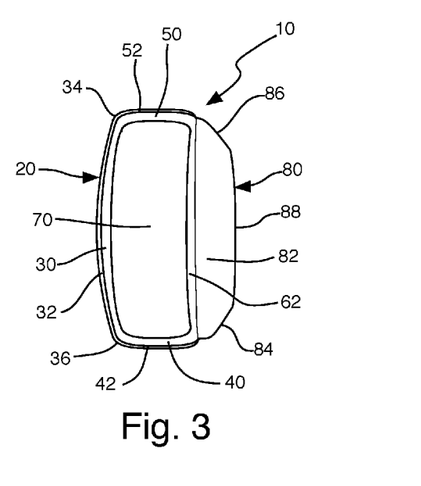
FIG. 3 is a top view of the present invention.
Figure 4:
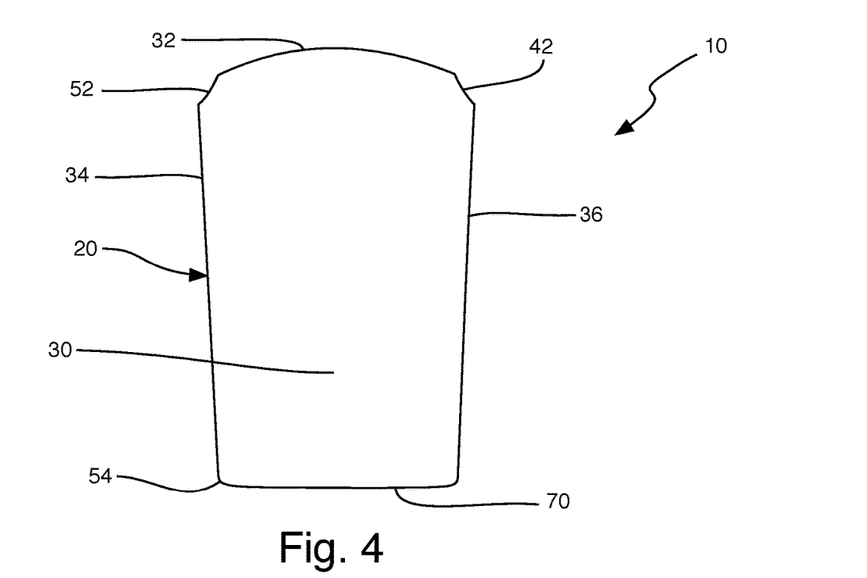
FIG. 4 is a front elevational view of the present invention.
Figure 5:
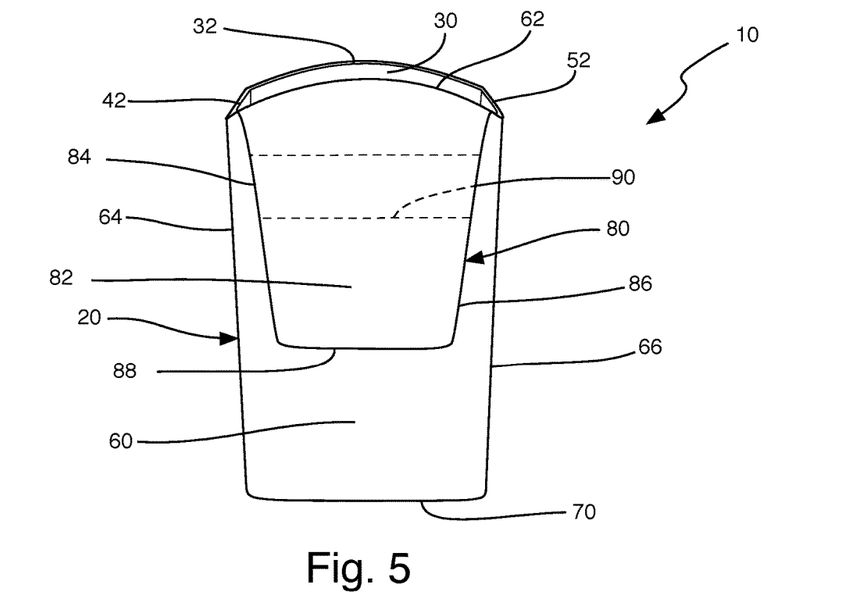
FIG. 5 is a rear elevational view of the present invention.
Figure 6:
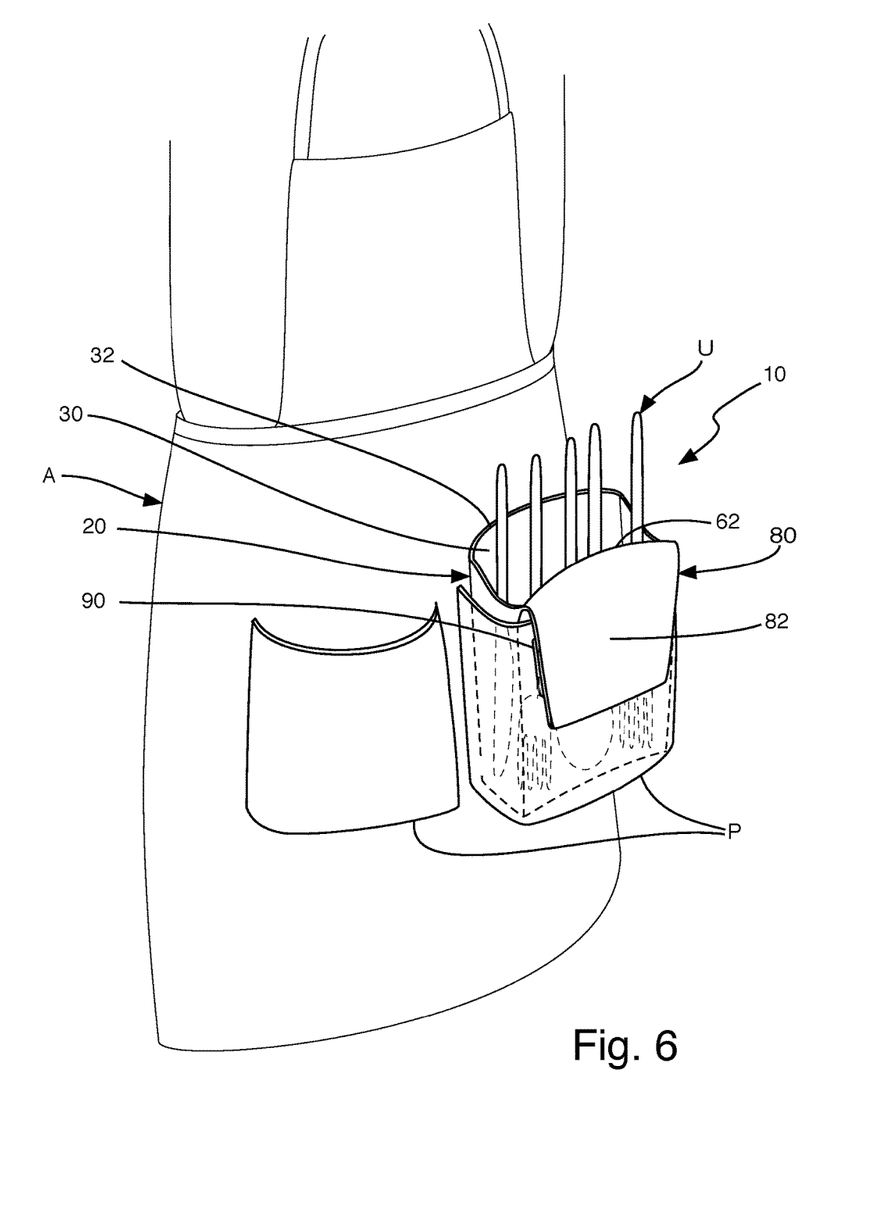
FIG. 6 is an isometric view of the present invention holding silverware and secured within an apron pocket.

As seen in FIG. 6, present invention 10 is in a first orientation, worn in an apron pocket and holding silverware, also defined as eating utensils U. Specifically, present invention 10 is secured within pocket P of apron A, whereby container assembly 20 is positioned within a pocket P and tension arm 80 extends over an exterior wall of the respective pocket P.

Figure 7:
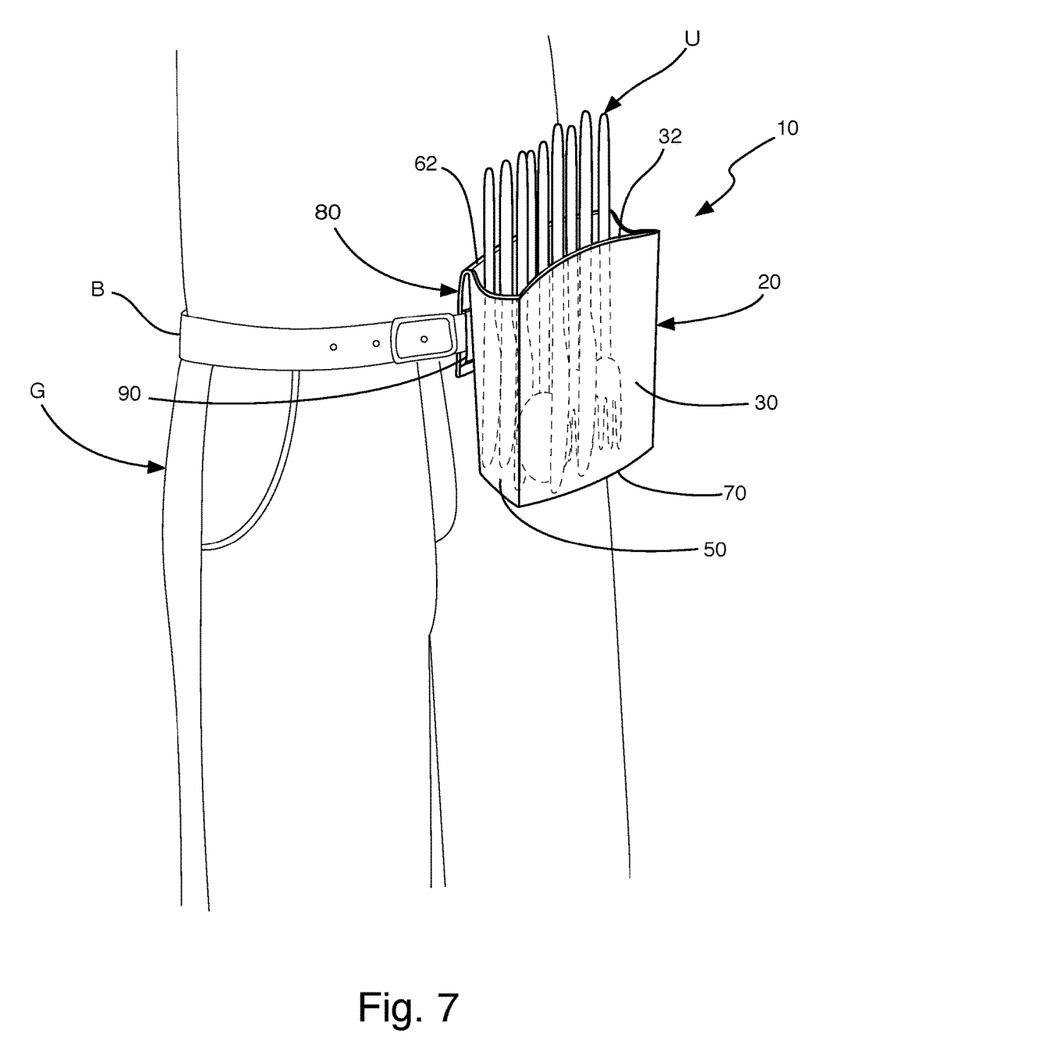
FIG. 7 is an isometric view of the present invention holding silverware and secured at its tension arm with a belt.

As seen in FIG. 7, present invention 10 is in a second orientation, secured by its tension arm and holding silverware, also defined as eating utensils U. Specifically, present invention 10 is mounted to a user's lower-torso garment G, whereby belt B is positioned through belt holder 90. Tension arm 80 is secured to belt B, while container assembly 20 is upside to receive utensils U.

Present invention 10 therefore facilitates the collecting of dirty silverware, also defined as eating utensils U when clearing tables and taking dirty dishes to a dishwasher. It also facilitates the collecting of dirty silverware when clearing tables while keeping a busser's hands free, saving the busser time, and reducing noise. Present invention 10 reduces accidents from falling silverware and eating utensils U when a busser is retrieving or moving them to a dishwasher and/or cleaning station. Present invention 10 also improves a quality of service provided at eating establishments by allowing the busser to stack plates in an easy and safe manner without dirty silverware positioned in between the plates and/or on a top plate. Present invention 10 is easy to wear and remove to allow for easy disposal of dirty silverware and eating utensils U at a dishwasher and/or cleaning station.

Figure 8:
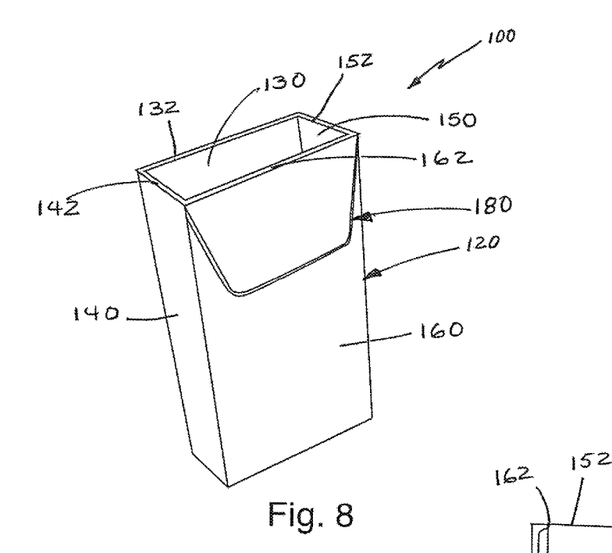
FIG. 8 is a rear isometric view of a first alternate embodiment dirty silverware retrieving device for eating establishments.
Figure 9:
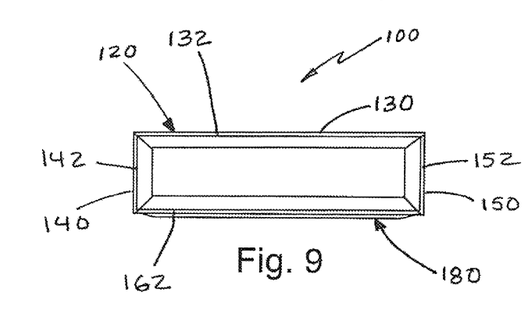
FIG. 9 is a top view of the first alternate embodiment seen in FIG. 8.
Figure 10:
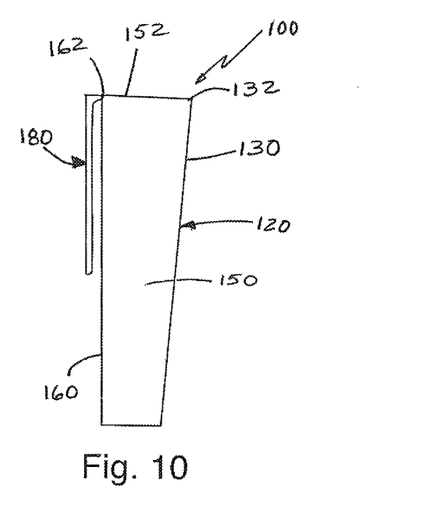
FIG. 10 is a side elevational view of the first alternate embodiment seen in FIG. 8.

Seen in FIGS. 8, 9, and 10 is a first alternate embodiment of present invention 10. Dirty silverware retrieving device for eating establishments 100 comprises container assembly 120 and tension arm 180. Container assembly 120 comprises front wall 130 with top edge 132, sidewall 140 with top edge 142, sidewall 150 with top edge 152, and rear wall 160 with top edge 162. Top edges 132, 142, 152, and 162 are substantially horizontal and on a same plane. Tension arm 180 extends from top edge 162.

Figure 11:
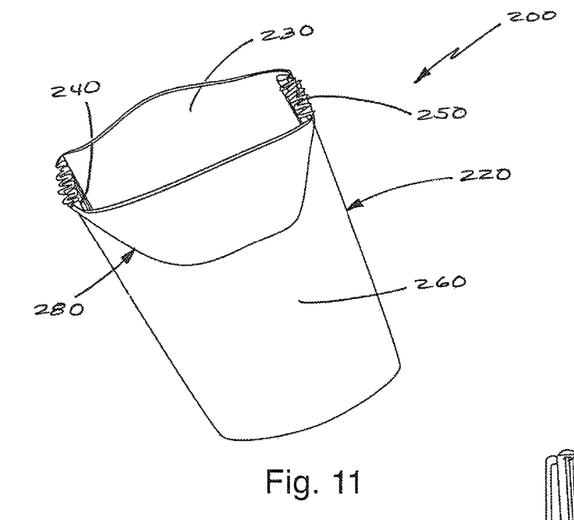
FIG. 11 is a rear isometric view of a second alternate embodiment dirty silverware retrieving device for eating establishments.
Figure 12:
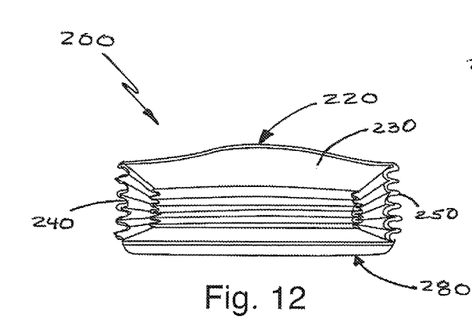
FIG. 12 is a top view of the second alternate embodiment seen in FIG. 11.
Figure 13:
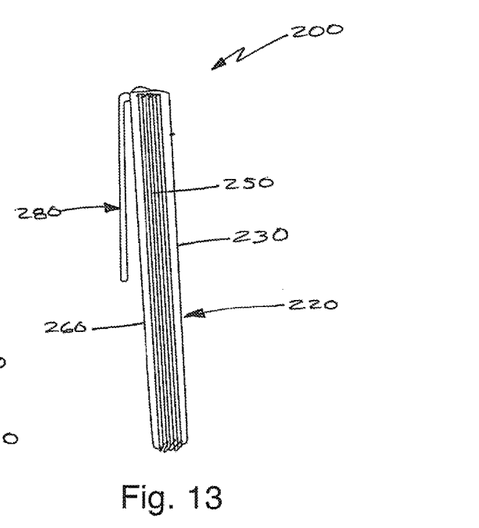
FIG. 13 is a side elevational view of the second alternate embodiment seen in FIG. 11.

Seen in FIGS. 11, 12, and 13 is a second alternate embodiment of present invention 10. Dirty silverware retrieving device for eating establishments 200 comprises container assembly 220 and tension arm 280. Container assembly 220 comprises front wall 230, sidewall 240, sidewall 250, rear wall 260, and bottom wall 270. Rear wall 260 has top edge 262. Tension arm 280 extends from top edge 262. Sidewalls 240 and 250, and bottom wall 270 are expandable.

Figures 14, 15, 16:
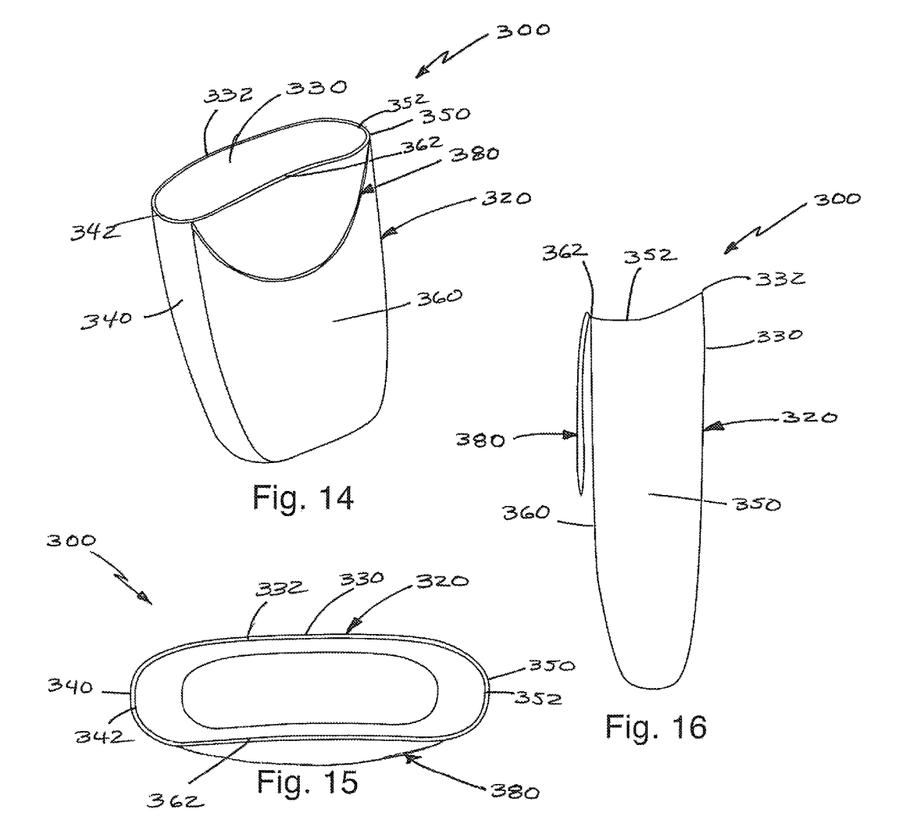
FIG. 14 is a rear isometric view of a third alternate embodiment dirty silverware retrieving device for eating establishments.
FIG. 15 is a top view of the third alternate embodiment seen in FIG. 14.
FIG. 16 is a side elevational view of the third alternate embodiment seen in FIG. 14.

Seen in FIGS. 14, 15, and 16 is a third alternate embodiment of present invention 10. Dirty silverware retrieving device for eating establishments 300 comprises container assembly 320 and tension arm 380. Container assembly 320 comprises front wall 330, sidewall 340, sidewall 350, rear wall 360, and bottom wall 370. Rear wall 362 has top edge 362. Tension arm 380 extends from top edge 362. Front wall 330, sidewalls 340 and 350, and rear wall 360 define an oval shape.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A dirty silverware retrieving device for eating establishments, comprising:
   A) a container assembly comprising a front wall, first and second sidewalls, a rear wall, a bottom edge, and a bottom wall, said container assembly holds dirty silverware, said front wall comprising a top edge, first and second side ends and a bottom edge, said first and second sidewalls comprising first and second lateral top edges, and first and second bottom ends respectively, said first and second lateral top edges having a downward curvature, and said rear wall being concavely shaped; and
   B) a tension arm that extends from said container assembly a predetermined distance towards said bottom edge, said tension arm is parallel to said rear wall, said tension arm comprises an exterior face and an interior face, said tension arm further comprises first and second side edges and a distal end edge, said tension arm has a belt holder defining a channel at said interior face, said belt holder extends from said first side edge to said second side edge, whereby said container assembly is configured to temporarily house dirty silverware.

2. The dirty silverware retrieving device for eating establishments set forth in claim 1, further characterized in that said rear wall further comprises first and second side ends.

3. The dirty silverware retrieving device for eating establishments set forth in claim 1, further comprising a bend, said bend is upwardly rounded and is defined as an upper end of said rear wall.

4. The dirty silverware retrieving device for eating establishments set forth in claim 3, further characterized in that said bottom wall is smaller than a cavity entrance defined by said top edge, said first and second lateral top edges, and said bend.

5. The dirty silverware retrieving device for eating establishments set forth in claim 1, further characterized in that said rear wall is parallel to said front wall.

6. The dirty silverware retrieving device for eating establishments set forth in claim 1, further characterized in that said container assembly is secured within a pocket of an apron, whereby said container assembly is positioned within said pocket and said tension arm extends over an exterior wall of said pocket.

7. The dirty silverware retrieving device for eating establishments set forth in claim 1, further characterized in that said belt holder secures said tension arm to a belt, while said container assembly opens upward to receive utensils.

8. The dirty silverware retrieving device for eating establishments set forth in claim 1, further characterized in that said front wall is convexly shaped.

9. The dirty silverware retrieving device for eating establishments set forth in claim 1, further characterized in that said top edge is curved upwardly.

10. The dirty silverware retrieving device for eating establishments set forth in claim 1, further characterized in that said first and second sidewalls, and said bottom wall are expandable.

11. The dirty silverware retrieving device for eating establishments set forth in claim 1, further characterized in that said front wall, said first and second sidewalls, and said rear wall define an oval shape.

* * * * *